United States Patent [19]

Binns

[11] 4,364,697
[45] Dec. 21, 1982

[54] BLIND FASTENER ASSEMBLY

[75] Inventor: Lloyd S. Binns, Fountain Valley, Calif.

[73] Assignee: SPS Technologies, Inc., Jenkintown, Pa.

[21] Appl. No.: 61,361

[22] Filed: Jul. 27, 1979

Related U.S. Application Data

[63] Continuation-in-part of Ser. No. 864,410, Dec. 12, 1977, abandoned.

[51] Int. Cl.³ ............................................. F16B 19/10
[52] U.S. Cl. ........................................ 411/38; 411/43
[58] Field of Search .................... 411/38, 34, 37, 43, 411/56, 69, 70, 44, 39

[56] References Cited

U.S. PATENT DOCUMENTS

| 2,887,003 | 5/1959 | Brilmyer | 411/34 |
| 3,107,572 | 10/1963 | Orloff | 411/34 |
| 3,262,353 | 7/1966 | Waeltz et al. | 411/39 |
| 3,277,771 | 10/1966 | Reynolds | 411/39 |
| 3,369,442 | 2/1968 | Darby et al. | 411/34 |
| 3,489,056 | 1/1970 | Blakeley | 411/56 X |
| 4,089,247 | 5/1978 | Dahl et al. | 411/34 |

*Primary Examiner*—Ramon S. Britts
*Attorney, Agent, or Firm*—Aaron Nerenberg

[57] ABSTRACT

A pull-type blind fastener assembly includes a mandrel, expander, sleeve and lock collar. The expander extends through aligned holes in at least two workpieces, that are to be joined and has an enlarged head and a shank portion with a pair of conical tapered surfaces separated by a constant diameter surface thereon, adjacent the blindside end thereof. The tubular sleeve has a maximum thickness portion adjacent one end, an intermediate portion of medium radial thickness and a minimum radial thickness portion adjacent the other end. When an axial force is exerted on the mandrel by means of a conventional pulling tool, the minimum sleeve thickness portion is forced successively over the first and second conical expander surfaces where it is expanded, and a radially outwardly extending bulb begins to form at approximately the intersection between the minimum and medium thickness portion adjacent the other end. When an axial force is exerted on the mandrel by means of a conventional pulling tool, the minimum sleeve thickness portion is forced successively over the first and second conical expander surfaces where it is expanded, and a radially outwardly extending bulb begins to form at approximately the intersection between the minimum and medium thickness portions of the sleeve. Continued axial force on the mandrel causes the leading end of the sleeve to contact the blindside workpiece surface, whereupon the bulb further expands to its full radial diameter and propagates along the axial length of the sleeve in a ripple manner until it contacts and clamps against the blindside surface of the workpiece at a point spaced radially from the point of contact of the sleeve leading end.

15 Claims, 12 Drawing Figures

BLIND FASTENER ASSEMBLY

BACKGROUND OF THE INVENTION

This application is a continuation-in-part of application Ser. No. 864,410 filed Dec. 12, 1977, now abandoned.

This invention relates to improvements in blind fasteners and to the joints produced therewith.

Advanced composite materials have recently been gaining increasing usage in various aerospace applications because they offer potential weight savings and increased stiffness. The anisotropic properties of composite material present a unique opportunity to optimize certain designs such as elongated aircraft stringers and ribs. In order to form acceptable joints of relatively thin sheet composite materials, conventional blind fasteners have not proven to be completely acceptable. One reason is the low allowable bearing stress of composite materials which means that the full tensile strength of the blind fastener may not be realized because of bearing failure of the composite material. Present blind fasteners have a relatively limited blind side bearing area and typically expand to approximately 1.3 times the original sleeve diameter. Another reason is that composite materials are weaker in shear, thus causing any holes to require greater edge distances and more area buildup to develop full efficiency of the composite material. These materials are further constructed of a resin matrix which has a tendency to crack when holes in the material are expanded, such as by cold working or by an interference fit fastener. Finally, fasteners which form against the blind side composite material surface tend to damage the relatively soft material surface by digging or gouging out some of the material during the bulb forming process.

In order to solve these problems, the present invention is directed to an improved blind fastener assembly which has a relatively large bearing area, does not expand the holes in the respective workpieces in which the fastener assembly is installed, and includes a feature for accommodating variations in workpiece thickness, otherwise known as a grip accommodating feature.

SUMMARY OF THE INVENTION

Accordingly, it is a general purpose and object of the present invention to provide an improved blind fastener assembly. It is a further object to provide an improved blind fastener assembly for use with composite materials. It is still another object to provide a blind fastener assembly in which variations in grip length are inherently accommodated. And, it is an object of the present invention to provide a blind fastener assembly which is expandable to approximately 1.5 times its unexpanded diameter.

These and other objects are accomplished according to the present invention by a blind fastener assembly including a pulling mandrel, a sleeve, an expander and locking means. The expander is formed to be placed through an opening in a workpiece, and the mandrel is placed through the expander with the sleeve carried thereon adjacent a headed, blindside end of the mandrel. The expander includes a headed end which is formd to bear upon an accessible surface of the workpiece, and a tapered surface on its outer circumference adjacent the other end thereof. The sleeve includes a first portion of greater radial thickness adjacent one end thereof and a second portion of reduced radial thickness adjacent the other end thereof juxtaposed from the expander means other end, and a discontinuity in the inside surface thereof between the first and second portions. In one embodiment, i.e., for a 3/16" diameter rivet, the sleeve second portion has an axial length "L" and a thickness "t," and a ratio of L/t of between approximately 4 to 6 is maintained. A ratio of the cross-sectional areas of the sleeve second portion to the sleeve first portion of between approximately 0.70 to 0.76 is also maintained. The dimension "L" is also formed to be less than the distance from the inaccessible workpiece surface to the expander means other end. Upon application of an axial force on the mandrel, the reduced thickness sleeve portion advances over the expander means tapered surface forcing the sleeve to form an initial hint of a bulb radially outwardly at approximately the point of discontinuity between the second portion and the intermediate portion. Continued axial force on the mandrel causes the reduced thickness portion to advance along the expander means outer surface until the leading end of the sleeve contacts the blindside workpiece surface and the bulb increases in diameter and propagates axially along the sleeve surface in a ripple manner until a portion of the bulb contacts the blindside workpiece surface over an area radially spaced from the area of contact of the leading end of the sleeve. The finally formed bulb assumes a heel and toe cross-sectional configuration against the blindside workpiece surface. When the mandrel has reached a predetermined axial position with respect to the accessible surface of the workpiece, further axial movement is discontinued, and the locking means is operative to lock the mandrel and expander together to eliminate relative motion therebetween in one direction. Thereafter the mandrel is broken off at approximately the accessible workpiece surface to form the final blind fastener assembly.

DETAILED DESCRIPTION OF THE PREFERRED EMBODIMENT

Figure 1:
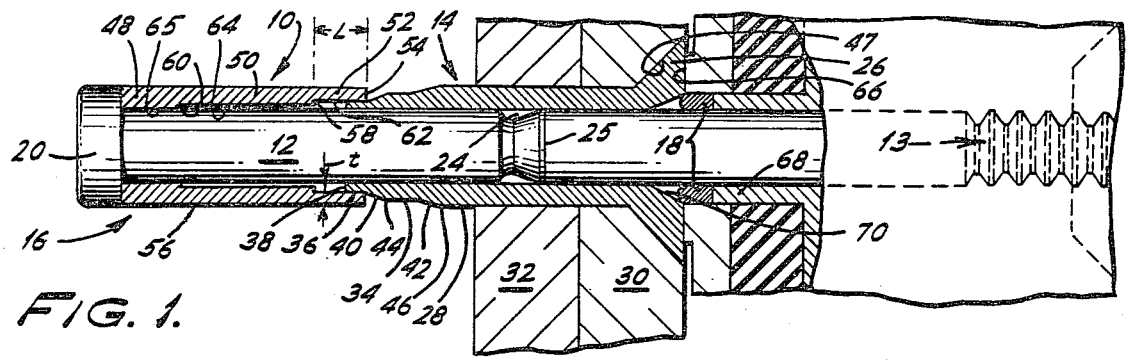
FIG. 1 is a cross-sectional view, with parts in elevation, illustrating one embodiment of a blind fastener assembly in accordance with the present invention, installed in a pair of workpieces prior to any forming operation.

Referring to FIGS. 1-4, a first embodiment of a blind fastener assembly in accordance with the present invention is shown in progressive stages of installation. Fastener assembly 10 includes a mandrel 12, an expander 14, a sleeve 16 and a locking collar 18. Mandrel 12 has an enlarged head 20 at one end thereof and a plurality of circumferential pulling grooves 13 adjacent its other end which are designed to be gripped by the collet and jaws assembly of a pulling tool 22, such as illustrated and described, for example, in my U.S. Pat. No. 3,915,055. Other non-shifting pulling heads are usable with the present blind fastener assembly. It should be understood that instead of the pulling arrangement illustrated and described herein, mandrel 12 and expander 14 could alternatively include standard mating threads which would be operative to advance the mandrel in an axial direction with respect to the expander in order to form the blind fastener assembly according to the present invention. Mandrel 12 also includes a lock groove 24 of reduced cross-sectional diameter into which locking collar 18 is forced at the end of the installation sequence, and a break notch 25 which is of a diameter that is substantially less than that of the lock groove.

Expander 14 includes an enlarged head 26, a first shank portion 28 of constant outside diameter which extends through aligned openings in a pair of workpieces 30 and 32, a second shank portion 34 of constant outside diameter smaller than the first shank portion and a third shank portion 36 of smallest constant outside diameter adjacent the tip end 38 of expander 14. Tip end 38 may typically be slightly rounded at the outer edge to aid the advancement of sleeve 16 thereover during installation of the fastener assembly. A first tapered surface 40 of increasing diameter extends between the third and second shank portions, and a second tapered surface 42 of increasing diameter extends between the second and first shank portions of expander 14. In a preferred embodiment tapered surfaces 40 and 42 are conical and each form an angle on the order of approximately 16° with the longitudinal axis of expander 14, but may generally be within the range of about 10° to 25°. It should however be understood that tapered surfaced 40 and 42 need not be flat as illustrated and described above, but may assume a curved configuration as well. The intersection line between tapered surface 40 and second shank portion 34 will be designated as 44, and the intersection line between tapered surface 42 and first shank portion 28 will be designated 46. While an expander having two tapered surfaces is illustrated and described in the present embodiment, it should be pointed out that the invention would also function if the expander has only one tapered surface. A configuration having one tapered surface will be shown and described in a second embodiment illustrated in FIGS. 6-8. Head 26 is designed to bear upon a complementary countersunk portion 47 in workpiece 30, and the surface of first shank portion 28 is designed to fit through the aligned openings with a relatively close fit (i.e., something less than an interference fit). Head 26 includes a recess 27 for accepting locking collar 18 at the end of the installation. It should be understood, however, that head 26 may assume other configurations than the one shown while still remaining within the spirit and scope of the invention. Sleeve 16 includes a maximum radial thickness portion 48 adjacent head 20 of mandrel 12, an intermediate reduced radial thickness portion 50 adjacent portion 48, and a minimum radial thickness portion 52 adjacent a forward end 54 of the sleeve. Sleeve 16 has a constant outside diameter surface 56, a first internal shoulder 58 between portions 50 and 52 and a second internal shoulder 60 between portions 48 and 50. The inside surfaces of minimum thickness portion 52, of intermediate thickness portion 50 and of maximum portion 48, will be designated 62, 64 and 65, respectively.

Figure 4:
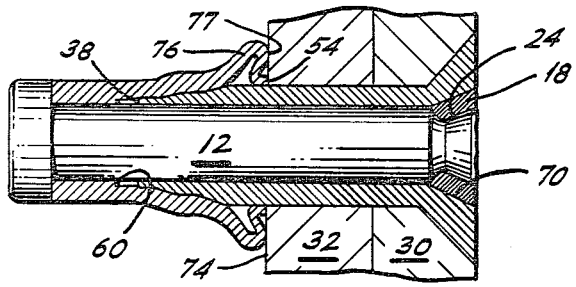
FIG. 4 shows the embodiment of FIG. 1 in a finally formed condition.
Figure 5:
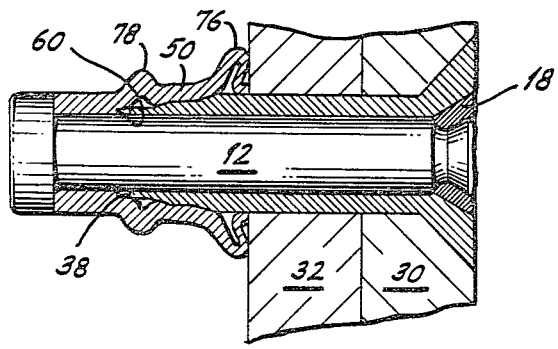
FIG. 5 shows the embodiment of FIG. 1 in a finally formed condition for a different grip condition (i.e., greater workpiece thickness)

To install the blind fastener assembly in a pair of workpieces, an axial force is exerted on mandrel 12 by means of pulling tool 22 including chuck jaws (not shown) within the tool which engage pulling grooves 13 on mandrel 12, as illustrated and described with reference to FIGS. 3-5 of U.S. Pat. No. 3,915,055, for example. This technique and the associated tool are quite conventional, and accordingly, a more detailed description will not be given. A surface 66 on the nose portion of the tool bears upon enlarged head 26 of expander 14 providing a reaction force during the pulling of mandrel 12. Concomitantly, a cylindrical anvil 68 within the tool provides an axial force on locking collar 18, forcing it against a tapered surface 70 in recess 27 of expander 14.

Figure 2:
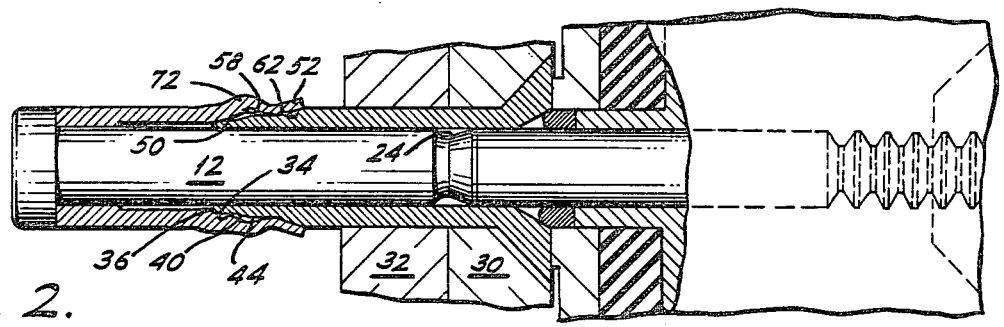
FIG. 2 shows the embodiment of FIG. 1 in a first intermediate condition.

As mandrel 12 is advanced axially by pulling tool 22, surface 62 on sleeve 16 contacts the first tapered surface 40 on expander 14, and sleeve portion 52 begins to advance over tapered surface 40 whereupon it is expanded from its original diameter. When sleeve portion 52 has advanced beyond intersection line 44 and onto second shank portion 34 of expander 14 to an axial position wherein first sleeve shoulder 58 is approximately radially aligned with intersection line 44, a slight outward bulbing or ripple 72 begins to form in the sleeve at approximately the location of first shoulder 58, as shown in FIG. 2. This outward bulbing or ripple is caused by a differential expansion or flaring of the different radial thickness portions 50 and 52 of the sleeve on either side of first shoulder 58. In effect, shoulder 58 is forced radially outwardly to the outside surface 56 of the sleeve 16 producing the initial ripple or bulb 72. The continuation of this initial bulbing is affected by certain conditions which will be discussed later. Portion 52 continues to advance over intersection line 44 and generally along second shank portion 34 until the sleeve forward end 54 contacts the second expander tapered surface 42 whereupon it is expanded an additional amount over its original diameter, and bulb 72 is also expanded a slight additional amount.

Figure 3:
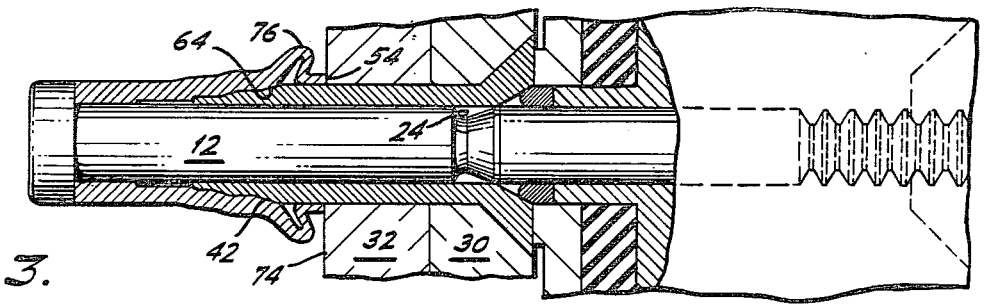
FIG. 3 shows the embodiment of FIG. 1 in a second intermediate, partially formed condition.

Further axial pulling of mandrel 12 caused sleeve forward end 54 to contact the inaccessible or blind surface 74 of workpiece 32, as illustrated in FIG. 3. Ripple 72 continues to expand radially outwardly as a result of the action of second tapered surface 42 on the inside surface 64 of sleeve 16, causing the axial force on the sleeve to be divided into radial and axial components. The radial force component serves to further radially outwardly expand the initial ripple 72, and the combined radial and axial force components cause the expanded bulb 76 to propogate axially along the outside surface of the sleeve as pulling of the mandrel is continued. The axial propagation (or otherwise referred to as a ripple action) of bulb 76 continues until an area 77 adjacent the radially outermost portion of the bulb contacts surface 74, as illustrated in FIG. 4. The bulb has a tendency to fold over as shown, and when sectioned, resembles the "heel and toe" form of the human footprint. Contact against surface 74 is therefore maintained at sleeve forward end 54 and over an area separated and radially outward from end 54. Bulb 76 is a resultingly large, generally uniform blind bulb, whose diameter is on the order of 50% greater than the original sleeve diameter, and the "footprint" configuration of the bulb is such that no delamination of material on the workpiece surface 74 is produced. When mandrel 12 had been pulled to the correct axial position with lock groove 24 adjacent the accessible surface of workpiece 30, locking collar 18 is forced into the void area between mandrel 12 and surface 70 in recess 27 of expander 14 to lock the components of the blind fastener assembly together.

It has been found that certain dimensional relationships in sleeve 16 are preferred for axial propagation of the initial bulb or ripple 72 as described above. To better understand this point, reference is made to FIG. 1 wherein the axial length of minimum radial thickness portion 52 is designated as "L" and the radial thickness of this same portion is designated as "t." When the ratio, $L/t \cong 5.0$, is maintained in the sleeve dimensions, the initial bulb or ripple 72 will reliably propagate in an axial direction toward workpiece surface 74. However, it has also been observed that when the noted ratio varies "significantly" from 5.0, then axial propogation of the initial bulb at the intersection line 44 will not occur. Instead, sleeve portion 52, only, will form a conventional bulb of reduced diameter between the shoulder and the forward end. Ratios of as much as 6.0 or as little as 4.0 will work, but yielded somewhat less reliable results. In addition, the ratio of the respective cross-sectional areas of sleeve portion 52 to sleeve portion 50 should be approximately 0.73 for a 3/16 inch diameter rivet. Other diameter sizes for the rivet may have different ratios.

It has been found that if this ratio is generally between 0.70 to 0.76, axial propagation of the initial bulb will reliably occur. For rivets having smaller or larger diameters, as stated above, it is believed that the ratio of the first cross-sectional area to the second cross-sectional area may vary. Finally, the length L of sleeve portion 52 must be less than the axial distance from workpiece surface 74 to the exposed end 38 of expander 14, otherwise formation of a bulb will occur by buckling of sleeve portion 52 in the conventional way to form a bulb of reduced diameter. It is to be expressly understood that this invention applies to rivets having diameters other than 3/16 inch.

FIGS. 1-4 illustrate a minimum grip condition wherein the thickness of workpieces 30 and 32 is approximately the minimum allowable thickness for the particular grip capability of the fastener assembly selected. In FIG. 5, a maximum grip condition joint is shown, wherein a second bulb 78 forms at approximately the area adjacent first sleeve shoulder 60 after the ripple action of bulb 76 terminates, in order to accommodate a greater workpiece thickness and to allow the mandrel to be pulled to the proper axial position wherein locking collar 18 is inserted between the mandrel groove and expander head to lock the fastener assembly together. Intermediate reduced thickness portion 50 buckles in a conventional manner to form second bulb 78. When the expander tip end 38 contacts second shoulder 60, as described above with respect to FIGS. 1-4, locking collar 18 is inserted and breakage of mandrel 12 occurs. The final joint is thus similar to the joint shown in FIG. 4 with the exception of the formation of second bulb 78. In such a maximum grip condition, the second tapered surface on the expander aids in properly expanding and forming the initial bulb or ripple 72 to its fully formed configuration, and thus is preferably included to meet the entire range of grip conditions encountered by the fastener assembly.

Figure 6:
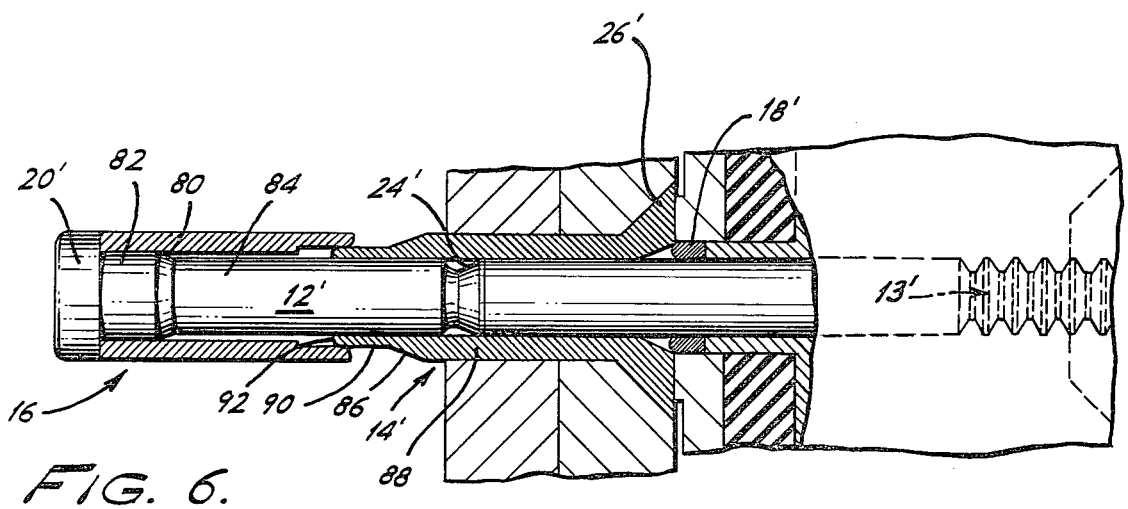
FIG. 6 is a partial cross-sectional view of a second embodiment of a blind fastener assembly in accordance with the present invention, installed in a pair of workpieces prior to any forming operation.
Figure 7:
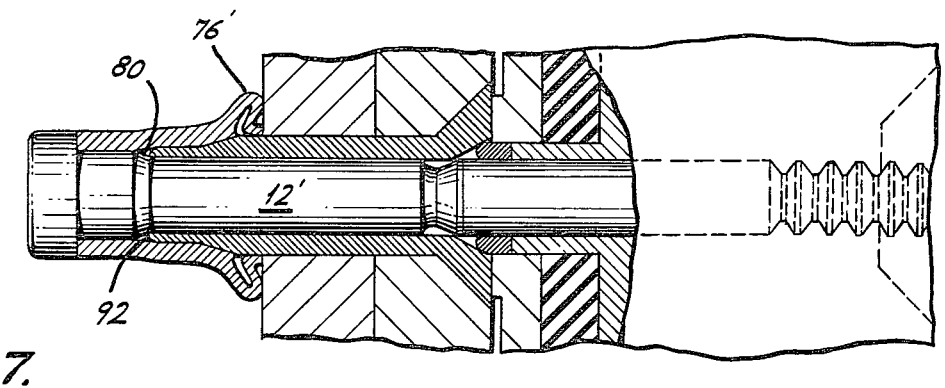
FIG. 7 shows the embodiment of FIG. 6 in an intermediate, partially formed condition.
Figure 8:
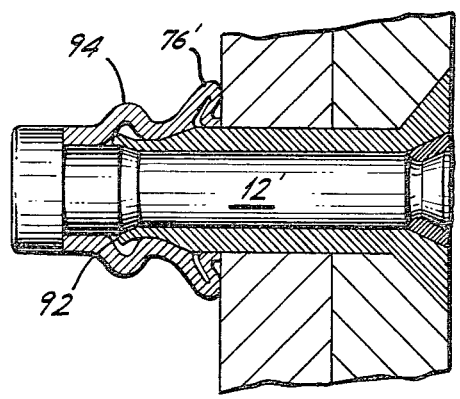
FIG. 8 shows the embodiment of FIG. 6 in a finally formed condition.
Figure 9:
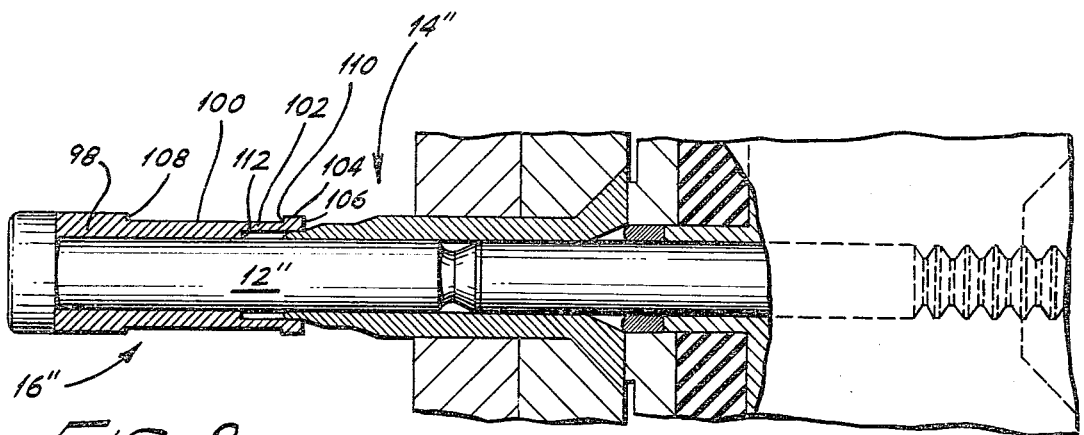
FIG. 9 is a cross-sectional view, with parts in elevation, illustrating a third embodiment of a blind fastener assembly in accordance with the present invention, installed in a pair of workpieces prior to any forming operation.
Figure 10:
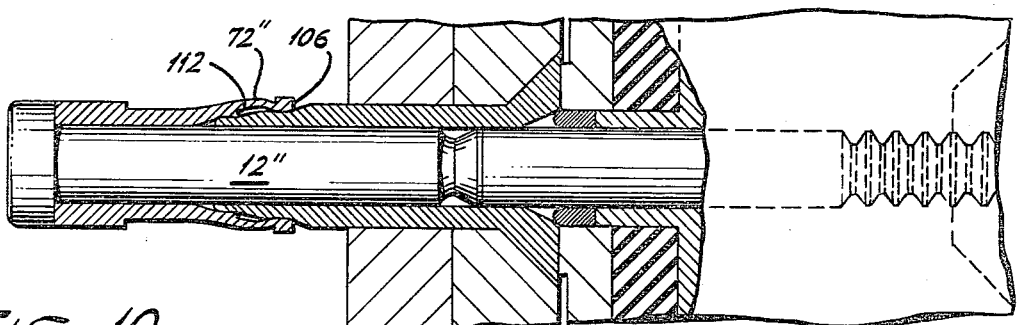
FIG. 10 shows the embodiment of FIG. 9 in a first intermediate condition.
Figure 11:
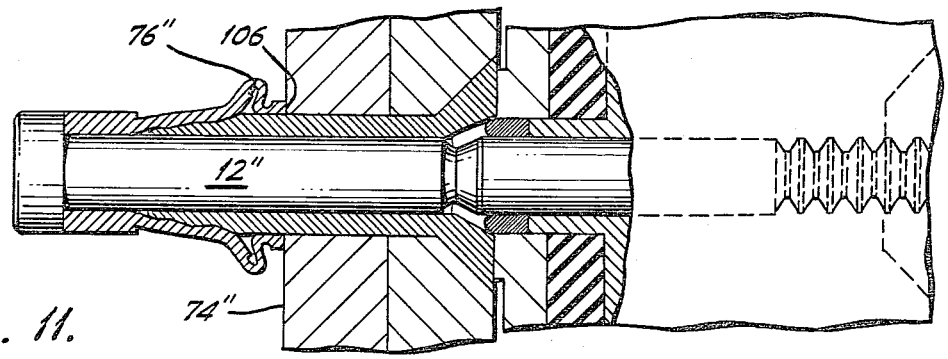
FIG. 11 shows the embodiment of FIG. 9 in a second intermediate, partially formed condition.
Figure 12:
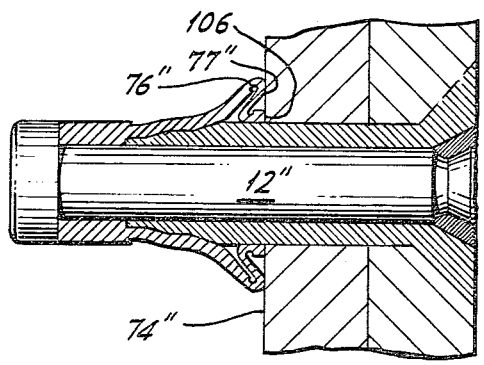
FIG. 12 shows the embodiment of FIG. 9 in a final formed condition.

A second embodiment of a blind fastener assembly in accordance with the present invention is illustrated in FIGS. 6-8. The components are essentially similar to the corresponding components described with respect to FIGS. 1-4, with the exception that mandrel 12' includes a tapered shoulder 80 intermediate enlarged head 20' and groove 24' resulting in a first shank portion 82 of greater diameter adjacent enlarged head 20' and a second shank portion 84 of reduced diameter adjacent groove 24'. A modified expander 14' includes a single tapered surface 86 separating a first shank portion 88 of greater diameter extending from the expander enlarged head 26' to tapered surface 86, and a second shank portion 90 extending from the tip end 92 of the expander to the tapered surface. Formation of the ripple blind bulb 76' occurs in a similar manner as described with respect to the embodiment shown in FIGS. 1-4. Formation of the second bulb 94, however, is produced by the mandrel tapered shoulder 80 contacting expander tip end 92 and forcing it radially outwardly against sleeve 16', initiating the formation of second bulb 94 in the sleeve as shown in FIGS. 7 and 8. As previously discussed, this second bulb is necessary for accommodating variations in workpiece thickness in order to allow the mandrel to be pulled to the proper axial position for insertion of the locking collar 18', and for mandrel breakoff.

A third embodiment of a blind fastener assembly in accordance with the present invention is illustrated in FIGS. 9-12. The mandrel 12", expander 14" and locking collar 18" shown and described remain the same as in FIGS. 1-4. A sleeve 16" usable in the present embodiment, includes a normal thickness portion 98 which is formed to be placed adjacent the enlarged head of the mandrel, an intermediate portion 100 adjacent portion 98, a minimum thickness portion 102 adjacent portion 100, and a bearing pad 104 having a bearing surface 106 at the forward end of the sleeve. The outside surface of sleeve 96 includes a first shoulder 108 between portions 98 and 100 and a second shoulder 110 between portions 102 and 104. The inside surface of sleeve 96 includes a shoulder 112 between portions 100 and 102. Installation of the blind fastener assembly of the present embodiment is similar to the installation of the fastener assembly illustrated and described with respect to FIGS. 1-4, with the exception that the stop shoulder (60 in FIGS. 1-4) is eliminated from the inside surface of the sleeve. This, however, does not materially affect the installation, as locking collar 18" will be inserted into the grooves between the expander and mandrel at the proper axial location in the pulling sequence, thus preventing axial over-travel of the mandrel. The specific advantage of sleeve 16" is the greater distribution and thus reduction of unit pressure which is applied to the inaccessible or blindside workpiece surface as a result of the increased bearing area of surface 106. When installing the fastener assembly in composite workpiece materials, this feature is advantageous toward reducing the amount of localized bearing failure in the surface material.

Having thus described several embodiments of the present invention, some of the many advantages should now be readily apparent. Formation of a unique configuration blindside bulb having a "heel and toe" bearing contour against a blindside workpiece surface in order to reduce the bearing pressure against that surface, is achieved with the present invention. There is no radial expansion of the workpiece holes during the formation of the joint. Variations in grip length (i.e., workpiece thickness) is accommodated by the formation of a second bulb axially spaced from the first bulb. Because of the controlled size and shape of the bulb which is formed, the blind fastener assembly of the present invention is ideally suited for use with advanced composite materials. An acceptable amount of preload is induced in the joint by the disclosed technique of locking the fastener assembly components together. It should also be clearly understood that the blind fastener assembly of the present invention is equally useful with conventional aerospace workpiece materials other than composite materials, such as, for example, aluminum and titanium alloys.

While in the foregoing there have been described several preferred embodiments of the invention, it should be understood that various changes and modifications can be made without departing from the true spirit and scope of the invention as recited in the appended claims.

I claim:

1. A blind fastener assembly for installation in a workpiece having an accessible and an inaccessible surface and an opening therebetween, said assembly comprising:

a mandrel having an enlarged head at one end thereof, an elongated shank portion and means on said shank portion adapted for advancement of said mandrel in a direction along its longitudinal axis;

expander means having an enlarged head at one end thereof formed to bear upon the accessible workpiece surface, a cylindrical tail section extending from the other end thereof, a tapered surface varying in radial thickness in a longitudinal direction from a minimum radial thickness at a point adjacent said cylindrical tail section to a maximum radial thickness at a location spaced from said other end, and a shank portion intermediate said enlarged head and said tapered surface, said shank portion having an outer surface formed to be placed in the workpiece opening, and an internal bore extending through said expander means carrying said mandrel shank portion;

expandable sleeve means carried on said mandrel shank portion proximate said enlarged head, said sleeve means including a first portion of greater radial thickness adjacent one end thereof facing said enlarged head and a second portion of reduced radial thickness adjacent the other end thereof facing said expander means other end, said sleeve means having a discontinuity in the inside surface thereof between said first portion and said second portion, said portion having an inner diameter substantially equal to the outer diameter of said cylindrical tail section and having a length which is greater than that of said cylindrical tail section, said second portion being adapted to be advanced along said expander means cylindrical tail section and tapered surface and expanded thereover upon advancement of said mandrel toward the inaccessible workpiece surface, said sleeve means forming a radially outwardly extending bulb at a location axially spaced from the inaccessible workpiece surface at approximately said inside surface discontinuity prior to contacting the inaccessible workpiece surface, said other end of said sleeve means ultimately contacting the inaccessible workpiece surface causing said outwardly extending bulb to expand radially and to propagate axially in a ripple manner toward the inaccessible workpiece surface and finally bear thereagainst over a selected area radially spaced from the area of contact of said sleeve means other end; and locking means operatively arranged between said expander means and said mandrel for locking said mandrel and said expander means together to eliminate relative motion therebetween in one direction.

2. A blind fastener assembly in accordance with claim 1 wherein said expander means first varying thickness portion is tapered to form a frusto-conical surface portion.

3. A blind fastener assembly in accordance with claim 1 wherein said expander means tapered surface forms an angle on the order of 16° with the longitudinal axis of said expander means.

4. A blind fastener assembly in accordance with claim 1 wherein said expander means includes another tapered surface axially displaced from said first tapered surface, said another tapered surface varying from a minimum radial thickness at a first point spaced from the maximum radial thickness of said first tapered surface to a maximum radial thickness at a location closer to said expander means one end.

5. A blind fastener assembly in accordance with claim 1 wherein said sleeve means second portion has an axial length "L" and a thickness "t" and wherein a ratio L/t of between about 4 and 6 is maintained in said sleeve means second portion.

6. A blind fastener assembly in accordance with claim 1 wherein said mandrel shank portion includes intermediate the ends thereof, a first portion of greater cross-sectional area and a second portion of smaller cross-sectional area separated by a shoulder.

7. A blind fastener assembly in accordance with claim 1 wherein said sleeve means includes a third portion between said first and second portions, said third portion having a radial thickness greater than the radial thickness of said second portion and less than said first portion, said third portion having an inner diameter that is greater than the inner diameter of said first portion and less than the inner diameter of said second portion.

8. A blind fastener assembly in accordance with claim 1 wherein said sleeve means second portion includes a bearing pad extending from said other end to a point axially spaced from said other end, said bearing pad having a radial thickness greater than the thickness of the remainder of said sleeve means second portion.

9. A joint assembly comprising a blind fastener according to claim 1 and a workpiece having an accessible surface and an inaccessible surface and an opening there between, said fastener being installed in said workpiece.

10. A blind fastener assembly according to claim 5 wherein the ratio of the cross-sectional area of said second portion to said cross-sectional area of said first portion is between approximately 0.70 to 0.76.

11. A blind fastener comprising:
    a mandrel having an enlarged head at one end, a generally tubular expander surrounding said mandrel, said expander having a cylindrical tail section at the end facing said mandrel enlarged head, a first tapered external surface of outside diameter increasing away from said tail section, and a workpiece engaging head at the other end, and a sleeve surrounding said mandrel between said mandrel enlarged head and said expander cylindrical tail section, the end portion of said sleeve facing said expander having an inner diameter that is substantially equal to the outer diameter of said cylindrical tail section and having a length which is greater than that of said cylindrical tail section, the ratio of the length L to the radial thickness t of said sleeve end portion being between about 4 and 6, the inner diameter of the portion of said sleeve adjacent said mandrel enlarged head being less than the inner diameter of said sleeve end portion, there being an interior shoulder at the end of said sleeve end portion.

12. A blind fastener according to claim 11 adapted for installation in a workpiece, said mandrel and expander being insertable through a hole in said workpiece so that said expander end including said tail section projects a certain distance beyond said workpiece, the length L of said sleeve end portion being less than said projecting distance between said workpiece and the expander end including said tail section, so that when said mandrel is pulled during installation, the interaction of said tail section with the shoulder at the end of said sleeve end portion will cause said sleeve to begin to bulb before the end of said sleeve facing said mandrel engages said workpiece.

13. A blind fastener according to claim 11 wherein said expander has a second tapered external surface of outside diameter increasing away from said tail section and located between said first tapered external surface and the expander end having said workpiece engaging head, said expander having an intermediate cylindrical section situated between said first and second tapered external surfaces and having an outer diameter greater than said tail section.

14. A blind fastener according to claim 11 or 13 wherein said sleeve has an intermediate portion between said sleeve end portion and said sleeve portion adjacent said mandrel enlarged head, said sleeve intermediate portion having an inner diameter and a radial thickness both of which are intermediate the respective corresponding inner diameters and radial thicknesses of said sleeve end portion and sleeve portion adjacent said mandrel enlarged head.

15. A blind fastener assembly in accordance with claim 11 wherein the ratio of the cross-sectional area of said sleeve second portion to said sleeve first portion is substantially 0.73 for a 3/16 inch diameter sleeve.

* * * * *